(12) United States Patent
Cripe et al.

(10) Patent No.: US 7,937,278 B1
(45) Date of Patent: May 3, 2011

(54) USAGE-BASED INSURANCE COST DETERMINATION SYSTEM AND METHOD

(75) Inventors: Frederick F. Cripe, North Barrington, IL (US); Stephen Fiete, Evanston, IL (US)

(73) Assignee: Allstate Insurance Company, Northbrook, IL (US)

( * ) Notice: Subject to any disclaimer, the term of this patent is extended or adjusted under 35 U.S.C. 154(b) by 1460 days.

(21) Appl. No.: 11/327,559

(22) Filed: Jan. 6, 2006

Related U.S. Application Data

(60) Provisional application No. 60/644,936, filed on Jan. 18, 2005.

(51) Int. Cl.
*G06Q 40/00* (2006.01)
(52) U.S. Cl. .......................................................... 705/4
(58) Field of Classification Search ....................... 705/4
See application file for complete search history.

(56) References Cited

U.S. PATENT DOCUMENTS

| | | | |
|---|---|---|---|
| 5,797,134 A | 8/1998 | McMillan et al. | |
| 5,956,691 A | 9/1999 | Powers | |
| 6,064,970 A * | 5/2000 | McMillan et al. | 705/4 |
| 6,397,212 B1 * | 5/2002 | Biffar | 707/704 |
| 6,868,386 B1 | 3/2005 | Henderson et al. | |
| 2001/0044733 A1* | 11/2001 | Lee et al. | 705/4 |
| 2003/0236686 A1* | 12/2003 | Matsumoto et al. | 705/4 |
| 2004/0039548 A1* | 2/2004 | Selby et al. | 702/179 |
| 2004/0153362 A1* | 8/2004 | Bauer et al. | 705/10 |
| 2004/0178883 A1* | 9/2004 | Haselsteiner et al. | 340/5.72 |
| 2006/0095301 A1* | 5/2006 | Gay | 705/4 |
| 2007/0061173 A1* | 3/2007 | Gay | 705/4 |

FOREIGN PATENT DOCUMENTS

JP 2002-024553 1/2002

OTHER PUBLICATIONS

U.S. Appl. No. 09/741,145, filed Dec. 21, 2000, Lee et al.
U.S. Appl. No. 09/907,545, filed Jul. 16, 2001, Burge.
U.S. Appl. No. 10/083,566, filed Feb. 27, 2002, Nakagawa et al.
U.S. Appl. No. 10/099,903, filed Mar. 13, 2002, Yoshioka et al.
U.S. Appl. No. 10/097,132, filed Mar. 14, 2002, Nozaki et al.
U.S. Appl. No. 10/272,673, filed Oct. 16, 2002, Harrison et al.
U.S. Appl. No. 10/270,202, filed Oct. 15, 2002, Hashiguchi et al.
U.S. Appl. No. 10/424,833, filed Apr. 29, 2003, Nitao et al.
U.S. Appl. No. 10/366,491, filed Feb. 12, 2003, Matsumoto et al.
U.S. Appl. No. 10/601,118, filed Jun. 23, 2003, Robertson et al.
U.S. Appl. No. 10/286,536, filed Oct. 31, 2002, Hong et al.
U.S. Appl. No. 10/690,459, filed Oct. 21, 2003, Farmer.

(Continued)

*Primary Examiner* — Jagdish N Patel
*Assistant Examiner* — Kevin Poe
(74) *Attorney, Agent, or Firm* — Foley & Lardner LLP

(57) ABSTRACT

A system and method for calculating and applying insurance costs. For vehicle insurance under one embodiment of the present invention, insurance costs are calculated on a per-mile basis in a nonlinear fashion, assigning different levels of risk based upon the distance driven by a customer. In one embodiment of the present invention, the first miles or kilometers driven by a customer are assigned a greater level of risk than later-driven miles or kilometers. The present invention provides an actuarial method that more closely conforms the cost of insurance for a particular vehicle to its annual mileage by creating a Rate Per Mile Factor (RMF), where the RMF is expressed as a function of annual mileage.

18 Claims, 6 Drawing Sheets

OTHER PUBLICATIONS

Litman, Todd, Appendices of "Distance-Based Vehicle Feasibility, Costs and Benefits", Aug. 7, 2001, pp. 1-40, Victoria Transport Policy Institute, Victoria, British Columbia, Canada.

Litman, Todd, "Implementing Pay-As-You-Drive Vehicle Insurance", Jul. 2002, pp. 1-14, Victoria Transport Policy Institute for The Institute for Public Policy Research (London), Victoria, British Columbia, Canada.

Litman, Todd, "Pay-As-You-Drive Pricing for Insurance Affordability", May 17, 2004, pp. 1-17, Victoria Transport Policy Institute, Victoria, British Columbia, Canada.

Litman, Todd, "Distance-Based Vehicle Insurance Feasibility, Costs and Benefits", Jul. 8, 2004, pp. 1-85, Victoria Transport Policy Institute, Victoria, British Columbia, Canada.

Funderburg et al., Keri, "Changing Insurance One Mile at a Time", Nov./Dec. 2003, pp. 34-38, Contingencies.

Axa Broker, "Traksure", Jan. 14, 2004, 3 pps. from website: http://www.guardian.ie/traksure.

Moran, Nuala, "Covering Risk Against Reward—Case Study—Insurance Sector", Aug. 6, 2003, 2 pps. from website: http://global.factiva.com/en/arch/save-results.asp, The Financial Times Limited.

MacSweeney, G., "Progressive Awarded Patent for GPS Rating; Company Business and Marketing", Oct. 1, 2000, 2 pps. from website: http://www.nexis.com/research/search/submitviewtagged, Gale Group, Inc.

O'Connor, Robert, "U.K.'s Norwich Union Studies Linking Premiums to Drivers' Use of Cars", Aug. 18, 2004, pp. 1-2, A.M. Best Company, Inc.

E-Business Strategies, Inc., "Progressive Insurance: Creating Value via Mobile Field Service", Apr. 2003, pp. 1-11, E-Business Strategies, Inc.

* cited by examiner

USAGE-BASED INSURANCE COST DETERMINATION SYSTEM AND METHOD

CROSS-REFERENCE TO RELATED APPLICATIONS

The present application claims priority to U.S. Provisional Patent Application No. 60/644,936, filed Jan. 18, 2005 and incorporated herein by reference in its entirety.

COPYRIGHT NOTIFICATION

A portion of the disclosure of this patent document contains material that is subject to copyright protection. The copyright owner has no objection to the facsimile reproduction of the patent disclosure as it appears in the patent files or records of the United States Patent and Trademark Office, but otherwise reserves all copyright rights whatsoever.

FIELD OF THE INVENTION

The present invention is related generally to the field of insurance. More particularly, the present invention relates to the calculation and application of insurance costs.

BACKGROUND OF THE INVENTION

To determine an annual rate of premium to be charged for an auto insurance policy, insurers establish a formula. The formula is typically filed with a state regulator and is changed only occasionally, for example from every 6 months to 2 years. The use of such a formula results in some drivers paying higher-than-average premiums and other drivers paying lower-than-average premiums. The basis for varying the price by driver is the insurers' recognition of risk factors related to the costs of claims. Risk factors are characteristics that inform an insurer about the cost of claims. For example, teenage drivers have more claims per car per year than middle-aged drivers. Therefore, age is used as a risk factor, and teenage drivers are charged higher-than-average rates. Insurers typically use tables to map risk factors to parameters that are used in the rating formula. For example, a typical rating formula has the form:

$$\text{Premium} = BR*F1*F2* \ldots *FN+E$$

In this formula, BR is a base rate level. The base rate is a parameter in an insurance ratemaking formula that is chosen. F1, F2, ... FN are parameters that are associated with risk factors, and E is a number that can represent a variety of factors for an additional premium. In this equation, F1 may be a factor based on, for example, the age of a driver. An insurer would possess a table that stipulates which value to use for F1 based on the driver's age. One such example is depicted in Table 1 below.

TABLE 1

| Age | Factor |
|---|---|
| 16 | 3.0 |
| 17 | 2.5 |
| 18 | 2.0 |
| 19 | 1.8 |
| 20 | 1.7 |
| 21-24 | 1.5 |
| 25-29 | 1.2 |
| 30-50 | 1.0 |
| ... | |

In some cases, there are formulas that are used to determine one or more of the risk factors. For example, insurers typically surcharge drivers who have had recent accidents or violations. The risk factor for drivers with no past accidents or violations is typically 1.0. For drivers with past accidents or violations, the amount of the surcharge, and therefore the size of the corresponding risk factor, depends on the number, type, and proximity in time to the present of past accidents and violations. For example, a citation for reckless driving may receive a larger risk factor than a citation for exceeding the speed limit by 8 m.p.h.

In the insurance industry, most conventional insurance policies currently offered involve the charging of a fixed cost for a given period of time. For example, a customer may purchase a vehicle insurance policy having a six-month policy period, and the customer estimates the number of miles he or she expects to drive the vehicle during that period.

Typically, companies quote costs in part based upon the estimated miles driven. For an average range of miles, companies typically offer no mileage discount or surcharge. For example, some companies provide no discount or surcharge when the estimated annual mileage is between 7,500 to 15,000 miles. Discounts of a certain percentage (for example, in the ten to fifteen percent range) may be applied by some companies to costs when the customer predicts annual mileage that is lower than the average range. The amount by which estimated mileage must be lower than average for a customer to qualify for a discount may vary by company. Additionally, surcharges of ten percent and more may be applied by some companies to vehicles where the customer predicts that he or she will exceed the average range.

The use of such estimated annual mileage in the calculation of a personal auto insurance premium is standard practice within the insurance industry. Currently, insurers typically classify annual mileage into a relatively small number of tiers, usually two or three, and apply the same rating factor to the entire tier. For example, a typical rating plan might classify annual mileage as "<8,000", ">=8,000 and <25,000" or ">=25,000", and a vehicle that is driven 800 miles annually would receive the same rating factor as a vehicle that is driven 7,999 miles annually. This approach is depicted in FIG. 7.

The standard approach to using annual mileage recognizes a perception that, as a group, people who drive less than the average driver have less-than-average annual costs of claims. Using annual mileage in a rating plan makes the premium charged to each individual driver reflect what has been believed to be the average claim cost differences between high and low mileage classes.

An issue with this standard approach, however, is that it is possible to further refine annual mileage classes if accurate measurements of annual mileage are available. Furthermore, the cost of claims for each annual mileage amount can be estimated using a continuous curve which relates annual mileage of any amount to cost per mile driven. Furthermore, the standard approach discussed above assumes a relationship between the expected cost and different mileage amounts, which is used to find a rating factor for annual mileage classes which have never been observed using interpolation or extrapolation from past experience.

An alternative to a fixed cost system involves the use of variable costs. Policies that include variable costs typically charge a customer on a "per mile" basis. The cost is based on a set cost for each mile or kilometer (or other distance unit) driven in a period and assumes that all incremental distances driven (miles, kilometers, etc.) have the same risk associated with them. Under this system, it is assumed that the more a person drives, the more risk the driver assumes; and the chance of having an accident is directly proportional to the number of miles or kilometers driven. The graph of prior art FIG. 1, from the Victoria Transport Policy Institute (March 2003), illustrates this perception that all miles or kilometers driven carry the same amount of risk, i.e., that the first mile driven by a user carries the same amount of risk as any later mile driven. Thus, the prior art treats miles driven and risk as having a substantially linear relationship. Table 2 below shows how a per-mile cost is calculated.

TABLE 2

| Exposure Unit Annual Mileage | Rate per Mile | Rate per Exposure Unit |
|---|---|---|
| 1,000 | $0.05 | $50 |
| 2,000 | $0.05 | $100 |

"Exposure" refers to the possibility of a loss and is the basic rating unit underlying an insurance premium. The unit of exposure varies based upon the characteristics of the insurance coverage involved. For automobile insurance, one automobile insured for a period of twelve months is expressed as one car year. Earned exposure units refer to the exposure units that are actually exposed to loss during the period in question. For automobile insurance, one earned exposure is expressed as one Earned Car Year.

An example of a conventional refinement involves the use of a function of the form: $y=a*x+b$, where y is an annual mileage factor, x is the annual mileage, and a and b are other parameters. This function implies that each additional mile a vehicle is driven adds the same amount of expected cost of claims. The expected cost of claims refers to the anticipated value of the cost of claims, based upon a historical perspective. In other words, this usage-based approach assumes that the overall risk is proportional to the number of miles driven. However, such an assumption is not necessarily correct and may lead to a cost of insurance that does not correspond to a commensurate level of risk. For example, this approach does not take into account factors that cause risk to vary with usage, such as the fact that driving is an acquired skill, and that many drivers become better with practice, thus reducing the risk associated with later-driven miles. An improved approach would reward drivers with more experience and skill by charging less per unit of usage.

SUMMARY OF THE INVENTION

The present invention relates to a system and method for calculating and applying insurance costs in a nonlinear manner on the basis of units of actual usage of a vehicle. The present invention involves calculating and applying insurance costs in such a manner whereby it is recognized that the risk of an accident may vary as vehicle usage increases. For example, many drivers reduce their incremental risk of an accident with each mile they drive because they are practicing and improving their driving skills. Therefore, for some amount of usage, such as a range of miles or kilometers driven, the fact that the driver has practiced his or her driving skills on a regular basis results in a lower level of risk. In one embodiment of the invention, there is an additional mileage range above which the skill level increases to a point of diminishing returns, and the distance traveled above that range becomes more proportional to a final linear relationship. By recognizing that risk is not the same for each unit of usage but instead varies, the method thus applies usage-based factors more precisely than was possible by conventional linear per-mile cost calculating methods.

The present invention involves the implementation and use of an actuarial method that more closely conforms the cost of insurance for a particular vehicle to its annual mileage by creating a Rate Per Mile Factor (RMF) or, more generally, a rate per distance unit factor. For example, a specific RMF can be implemented which varies by mile, and this information can be used to create an annual mileage factor which is determined by a continuous function of annual miles.

By applying a variable rate per mile factor in accordance with the present invention, one can achieve a better alignment of per-mile-based premiums with driving risk based upon mileage that is correlated with losses with a large number of insureds driving the same number of miles annually. Additionally, by applying statistics to per-mile pricing that fits one or more curves to the loss per mile driven data, a per mile driven factor can be determined for all numbers of miles driven. For any given individual, the premium can therefore be determined in part on a per mile rating class that reflects the losses associated with many others that fall into the same mileage class.

Further advantages and features of the present invention will be apparent from the following specification and drawings illustrating some embodiments of the present invention.

DETAILED DESCRIPTION OF THE PREFERRED EMBODIMENTS

Figure 1:
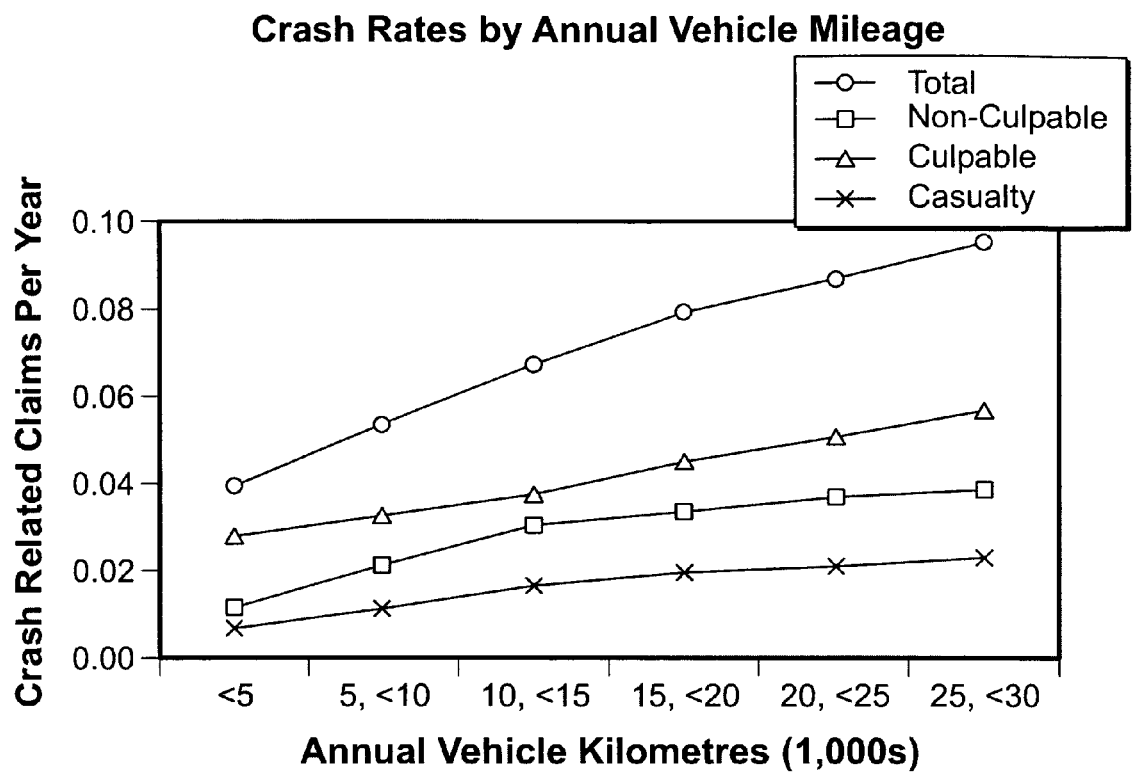
FIG. 1 is a prior art graph showing the conventionally-held perception that all miles or kilometers driven by an individual carry the same amount of risk.
Figure 2:
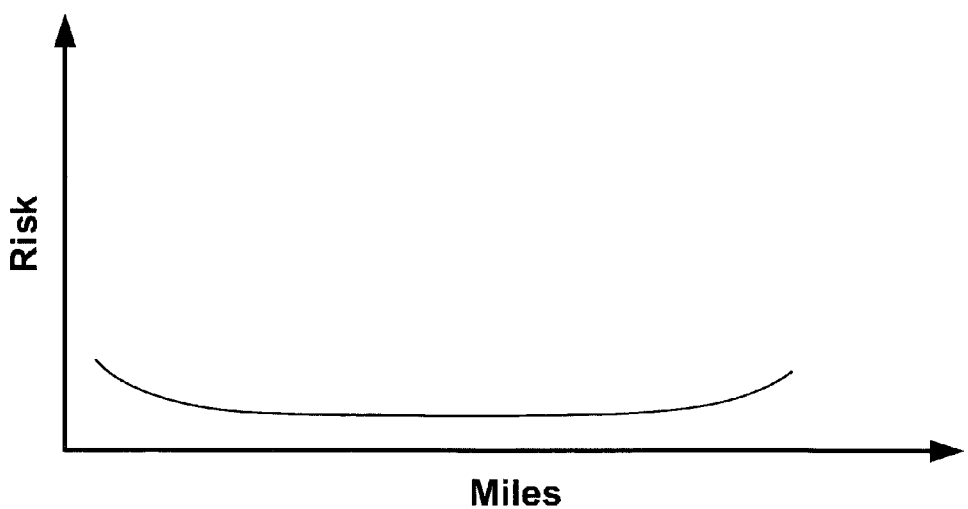
FIG. 2 is a graph demonstrating the concept embodied in the present invention showing a nonlinear relationship between the distance driven by an individual and the total risk involved for the particular number of miles driven.

The present invention involves a system and method for calculating an insurance cost in a nonlinear fashion in order to address in part the fact that different amounts of usage may possess a different risk level. FIG. 2 illustrates the general concept of how risk level may correlate to vehicle usage by an individual. As shown in FIG. 2, which is one of many possible examples of this correlation, when a user drives only a few miles during a given period, his or her driving skills are likely to be fairly poor, increasing the level of risk involved in driving. As the individual drives more miles, however, this risk is reduced as the person's driving skills improve. Eventually, the number of miles driven increase to a point where a driver's skills improve less and less, resulting in a more conventional linear relationship between the number of miles driven and the level of risk involved.

More particularly, the present invention describes a method of calculating an annual mileage factor that can be used in the basic annual premium calculation described above using the formula $F=(RMF)*(Annual\ Mileage)/B$. In this formula, B is a selected base level of annual mileage and RMF is a rate per mile factor that reflects the relative expected annual cost of claims per annual mile driven. The base level is an arbitrarily chosen annual mileage level where the RMF is set to a value of 1.0. Choosing base levels for rating variables is common practice in insurance rating formulae.

It should be noted that, although the RMF is discussed herein specifically as a "rate per mile factor," such a factor can be based upon other distance units, such as kilometers. It should therefore be understood that, as used herein, RMF could also represent a rate per distance unit factor that is based upon a measurement other than miles. It should also be understood that the term "mileage" is not intended to be limited to only miles-based scales.

Annual mileage can be measured in a variety of ways. For example, annual mileage can be measured by the policyholder's self-reporting, an automated data collection device attached to the vehicle, or via wireless transmission from the vehicle. The annual mileage factor determined by the above formula may be applied to a previous, current, or future rating period of the policy for an insured vehicle.

Figure 6:
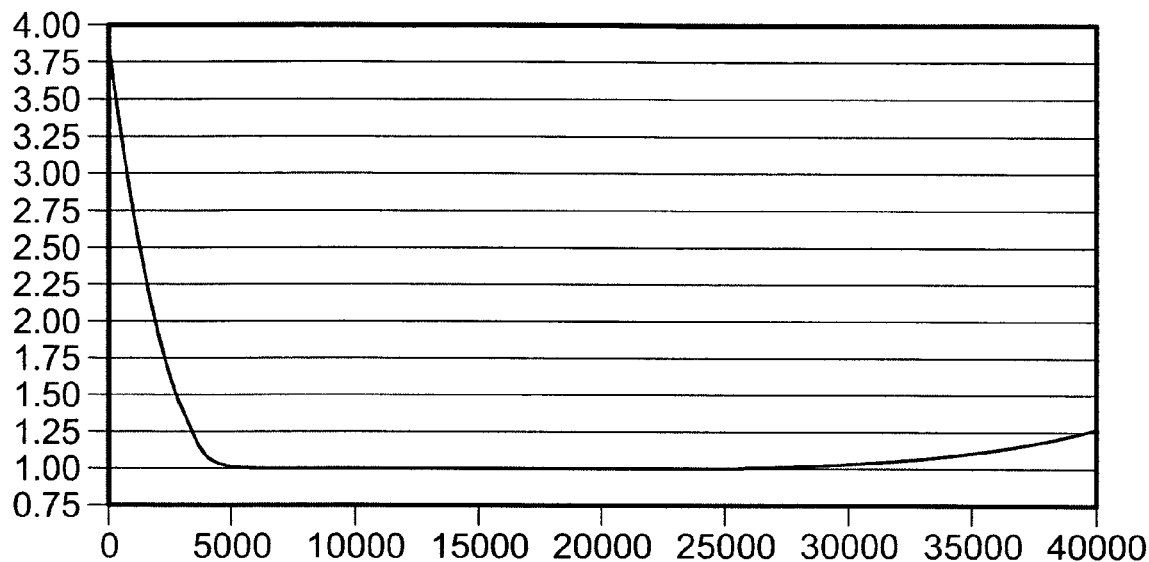
FIG. 6 is a plot showing RMF vs. Annual Mileage in accordance with the principles of the present invention
Figure 7:
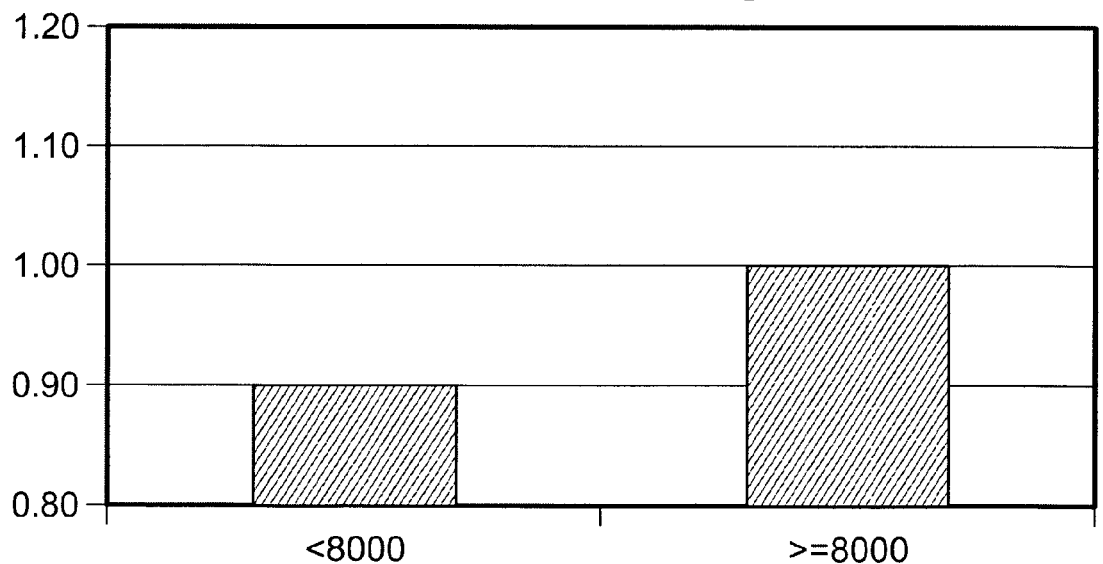
FIG. 7 is a chart showing a traditional method for designating an Annual Mileage Factor based upon the Actual Mileage Driven or estimated to be driven.

The RMF is determined using a formula which generates the "u-shape" shown in FIG. 6. There are a variety of algebraic expressions which describe similar u-shape curves. Two such examples are discussed below. However, it should be noted that the present invention covers any method of describing how the RMF should vary as a function of annual mileage that has a U-curve shape when graphed.

In a first example, the RMF is determined based upon the following formulae:

$$RMF = 1 + c^*(L-x)^p \text{ if } x < L$$

$$RMF = 1 + d^*(x-U)^p \text{ if } x > U$$

$$RMF = 1 \text{ if } L <= x <= U$$

In these formulae, x is the estimated or recorded number of annual miles driven, and L, U, c, d, and p are parameters estimated by the entity designing the rating formula. L and U can represent the lower and upper bounds for the "middle annual mileage range" where the RMF possesses its lowest value. c and d can represent steepness parameters which show how fast the RMF increases as the annual mileage moves from the middle range. It should be noted that "steepness" can also be characterized as a varying slope. The parameter p can represent the "curviness" of how the RMF increases as the annual mileage moves from the middle range. If p=1, then the RMF is piecewise linear. In other words, p represents the rate at which the slope changes. The formula itself is determined by the shape of graph the designer is attempting to create.

In a second example, the RMF is determined based upon the following formulae:

$$RMF = \exp(c^*(L-x)) \text{ if } x < L$$

$$RMF = \exp(d^*(x-U)) \text{ if } x > U$$

$$RMF = 1 \text{ if } L <= x <= U$$

In this example, x is the estimated or recorded annual miles driven. L, U, c, and d, are parameters estimated by the entity designing the rating formula.

Whichever RMF formulae is used, the parameters of the RMF formula may be determined in a variety of ways in order to achieve a "U-shape" in the shape of the curve for the expected cost per mile. The reason for the U-shape is that cars driven very little have more claims events per mile per year because their drivers are not as practiced as those drivers who drive average amounts per year. Additionally, cars that are driven excessively have more claim events per mile per year because their drivers are more likely to suffer from fatigue due to the excessive driving levels.

One method for estimating the parameters for the RMF formulae involves using a data set which has earned car years and claim counts aggregated for each annual mileage amount in an insurer's database. A sample of such a database is depicted in Table 3 below:

TABLE 3

| Annual Mileage | Earned Car Years | Claim count | Frequency |
|---|---|---|---|
| 4587 | 2 | 0 | 0.000 |
| 4662 | 5 | 1 | 0.200 |
| 4787 | 8 | 1 | 0.125 |
| 4825 | 9 | 0 | 0.000 |
| 4881 | 1 | 1 | 1.000 |
| 4957 | 9 | 5 | 0.556 |
| 5067 | 15 | 8 | 0.533 |
| 5151 | 4 | 0 | 0.000 |
| 5272 | 9 | 1 | 0.111 |
| 5357 | 7 | 3 | 0.429 |
| 5411 | 54 | 5 | 0.093 |
| 5505 | 3 | 0 | 0.000 |
| 5615 | 7 | 0 | 0.000 |

This method fits a curve to relate expected value of frequency to annual miles. A variety of statistical methods may be used to infer parameter estimates for the formula used to fit the curve. As used in Table 3, "frequency" refers to the number of times a claim occurs. There is a relationship between the number of claims and the number of exposures. Therefore, actuaries usually express claim incidence in terms of claim count per exposure unit (such as claim count per earned car year).

The reason expected costs between drivers varies by annual mileage is that the expected number of claims varies by annual mileage. The method of the present invention looks at how many claims are made per mile driven for each annual mileage amount recorded, and fits the data to a U-shaped curve. A typical method for performing this action is to specify a deviance function to evaluate the difference between observed and fitted values. A deviance function, d, applies to two values, a and b, and must satisfy the following properties:

$$d(a,b) >= 0$$

$$d(a,a) = 0$$

The term "deviance" can refer to the deviance between two numbers, or a sum of deviance function measures. For example, if there were a set of values in a data collection and a model was used to produce corresponding fitted values, then there is a deviance measure for each pair of observed and fitted values. The sum of those measures is called the deviance for the set of data.

A commonly used deviance function is $d(a,b) = (a-b)^2$, which is called the squared error. The sum of squared errors over a collection of observed and expected values is used to measure how well a model describes data.

Implementing the method of the present invention involves finding parameters for the RMF curve that minimize the deviance from the historical data. To perform an analysis using frequency data, the frequency level for the base class is estimated. The RMF formula parameters are also estimated. In the examples below, an annual mileage level of 15,000 is selected to be the base level of annual mileage. The base frequency is the expected value of claim count per exposure for the designated base level of annual mileage, and the RMF measures the relative difference in claim count per mile between different annual mileage levels. Combining the base frequency, the RMF, earned exposures, and annual mileage allows one to compare fitted claim counts to actual claim counts. A fitted claim count is essentially the expected or anticipated claim count. Therefore, the Fitted Claim Count= (Earned Car Years)*(base freq.)*RMF*(Annual Mileage)/B. The RMF is calculated using the second formula above with L=5000, U=25000, p=2.1, c=exp(−15), d=exp(−13), B=15000, and base freq.=0.05. An illustration of squared error deviance in this situation is shown in Table 4 below.

TABLE 4

| Annual Mileage | Earned Car Years | Claim Count | Frequency | Fitted Claim Count | Deviance (squared error) |
|---|---|---|---|---|---|
| 4587 | 2 | 0 | 0.000 | 0.033 | 0.001 |
| 4662 | 5 | 1 | 0.200 | 0.083 | 0.842 |
| 4787 | 8 | 1 | 0.125 | 0.131 | 0.756 |
| 4825 | 9 | 0 | 0.000 | 0.147 | 0.022 |
| 4881 | 1 | 1 | 1.000 | 0.016 | 0.968 |
| 4957 | 9 | 5 | 0.556 | 0.149 | 23.534 |
| 5067 | 15 | 8 | 0.533 | 0.253 | 60.011 |
| 5151 | 4 | 0 | 0.000 | 0.069 | 0.005 |
| 5272 | 9 | 1 | 0.111 | 0.158 | 0.709 |
| 5357 | 7 | 3 | 0.429 | 0.125 | 8.266 |
| 5411 | 54 | 5 | 0.093 | 0.974 | 16.209 |
| 5505 | 3 | 0 | 0.000 | 0.055 | 0.003 |
| 5615 | 7 | 0 | 0.000 | 0.131 | 0.017 |
| Total | | | | | 111.340 |

If the parameter values are changed to L=5000, U=25000, p=1.5, c=exp(−25), d=exp(−13), B=15000, and base freq.=0.1, then the following fit results as shown in Table 5:

TABLE 5

| Annual Mileage | Earned Car Years | Claim count | Frequency | Fitted Claim Count | Deviance |
|---|---|---|---|---|---|
| 4587 | 2 | 0 | 0.000 | 0.061 | 0.004 |
| 4662 | 5 | 1 | 0.200 | 0.155 | 0.713 |
| 4787 | 8 | 1 | 0.125 | 0.255 | 0.555 |
| 4825 | 9 | 0 | 0.000 | 0.290 | 0.084 |
| 4881 | 1 | 1 | 1.000 | 0.033 | 0.936 |
| 4957 | 9 | 5 | 0.556 | 0.297 | 22.114 |
| 5067 | 15 | 8 | 0.533 | 0.507 | 56.150 |
| 5151 | 4 | 0 | 0.000 | 0.137 | 0.019 |
| 5272 | 9 | 1 | 0.111 | 0.316 | 0.467 |
| 5357 | 7 | 3 | 0.429 | 0.250 | 7.563 |
| 5411 | 54 | 5 | 0.093 | 1.948 | 9.315 |
| 5505 | 3 | 0 | 0.000 | 0.110 | 0.012 |
| 5615 | 7 | 0 | 0.000 | 0.262 | 0.069 |
| Total | | | | | 98.000 |

The second fit as shown in Table 5 has a lower deviance (sum of squared errors) than the first fit as shown in Table 4. Therefore, the parameters in this second fit are superior to those in the first fit. The method of minimizing deviance to find parameters involves finding those parameters which minimize this sum total. Known numerical methods provide a variety of techniques to search for parameters to minimize or maximize the value of a formula.

Squared error is a popular deviance function because calculations for finding parameter values to minimize the squared error are often fairly simple. Other deviance functions are also currently used in insurance ratemaking for estimating parameters of risk factors. Table 6 below shows a few such examples.

TABLE 6

| Formula | Description |
|---|---|
| $\Sigma (x_i - \mu_i)^2$ | Squared Error |
| $\Sigma \lvert x_i - \mu_i \rvert$ | Sum of Absolute Error |

TABLE 6-continued

| Formula | Description |
|---|---|
| $2*\Sigma (x_i - \mu_i)^2/(x_i*\mu_i^2)$ | Inverse Gaussian Deviance |
| $2*\Sigma (x_i*\ln(x/\mu_i) - (x_i - \mu_i))$ | Poisson Deviance |
| $2*\Sigma (x_i - \mu_i)/\mu_i - \ln(x_i/\mu_i))$ | Gamma Deviance |

In these formulae, $x_i$ is the observed claim count for a given annual mileage amount, and $\mu_i$ is the fitted claim count for a given annual mileage amount. It should be noted that the "observed claim count" is the actual claim count, while the "fitted claim count" is a manufactured value. Each of the deviance functions given in Table 6 can be found in actuarial or statistical literature, and a wide variety of other possible functions could also be used based upon a designer's or analyst's own judgment.

The following is one application of the disclosed invention, where claim count data for 995,363 car years (hereinafter "Actual Data") is analyzed. The Actual Data can be presented like the small tables above, but there are in reality 28,608 different annual mileage levels. If a large insurer were collecting accurate measurements for every vehicle it insured, then the use of much more than the 13 mileage levels shown in the above example would be required for improved precision.

The following steps depict one method of performing the disclosed invention using the Actual Data. First, the parameters for the RMF curve are estimated in accordance with the description provided previously. This estimation can be performed, for example, using the PROC NUN procedure of the SAS programming language. Basically, PROC NLIN attempts to find the parameters which will minimize the sum of squared differences between actual claim counts and fitted claim counts. The next step involves the calculation of annual mileage factors (AMF's) that would be used in the standard or traditional approach. The resultant differences between the first and second steps are then compared.

Figure 8:
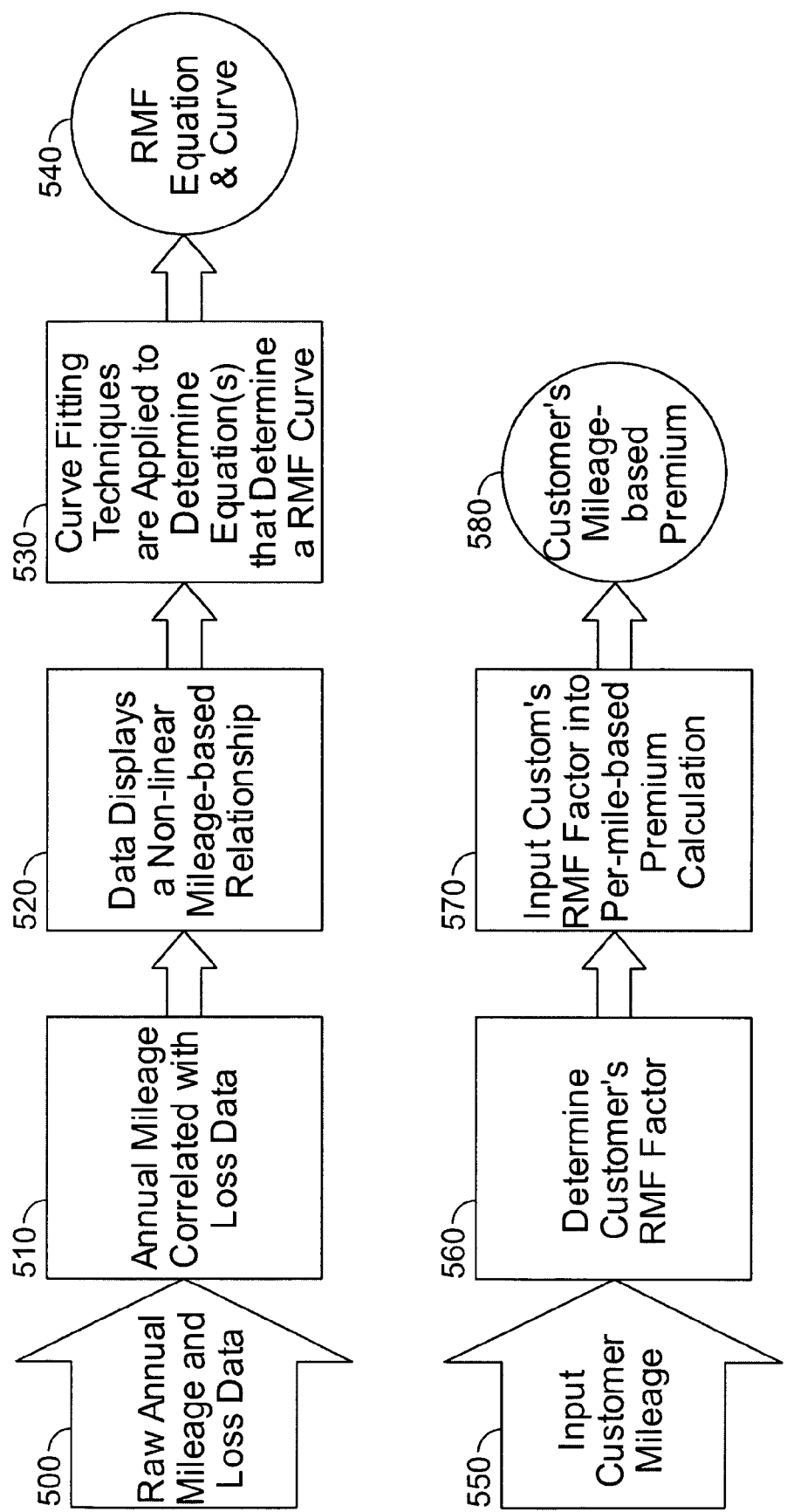
FIG. 8 is a flow chart showing the implementation of the per-mile rating method of one embodiment of the present invention.

FIG. 8 is a flow chart showing the implementation of the per-mile rating method of the embodiment of the present invention discussed above. At step 500, raw annual mileage and loss data is input. At step 510, the annual mileage is correlated with the loss data. At step 520, the data displays a non-linear, mileage-based relationship. At step 530, curve fitting techniques are applied in order to determine one or more equations that closely reflect a RMF curve. As a result of this process, an RMF Equation and Curve are reflected at step 540.

At step 550, a customer's mileage is input. At step 560, the customer's RMF factor (based upon the result reflected at step 540) is determined based upon the input customer mileage. At step 570, the customer's RMF factor is input into a per-mile-based premium calculation. As a result and at step 580, the customer's mileage-based premium is determined. In various embodiments of the invention, other criteria, such as the age of the customer, the geographical location of the customer's residence, characteristics of the vehicle driven by the customer, the customer's driving record and combinations thereof, may be used as additional factors in the determination of the mileage-based premium. In still other embodiments, such criteria may be considered after the mileage-based premium is determined in order to obtain a further modified premium.

The following is a parameter estimation SAS log according to one particular embodiment of the present invention.

```
1   /* annual mileage illustrative example */
2   /* written by s. fiete */
3
4
5   options nocenter ps=20000 mlogic symbolgen;
6   run;
7
8   /* this code generates simulated loss experience for a population of vehicles
9   insured for 1 year. Each vehicle is assigned a random annual mileage amount not
9 ! less
10  2000 miles. The number of claims for each vehicle is simulated from a Poisson
11  distribution where the mean is function of annual mileage.
12
13  once the simulated population is established we demonstrate a method of
14  estimating the parameters which describe the relationship between annual
15  mileage and expected frequency of claims. In this example, the Gauss-Newton
16  method is used to solve for parameters that will minimize the sum of squared
17  differences between actual claim counts and estimated expected value of claim
18  counts at each level of annual mileage.
19  */
20
21
22
23
24  /* annual mileage distribution is assumed to have a Gaussian distribution, but a
24 ! minimum of */
25  /* 2000 miles is imposed */
26  %let mu=15000;
27  %let sigma=5000;
28  run;
29
30  /* marginal claim count per mile
31
32      a+c*(1-x)^p if x<1
33  y=a           if 1<=x<=u
34      a+d*(x-u)^p if x>u
35
36  claims per car per year = (claim rate/mile)*(Annual miles) * (other factors)
37
38  y=claim rate/mile
39  x=annual miles
40  solve for a, c, d, p, l, u
41
42                          */
43  /* actual parameters for simulation */
44  %let l=6000;
45  %let u=25000;
46  %let c=exp(-11.5);
47  %let d=exp(-12);
48  %let p=1.8;
49  %let base=.05/15000; * 5% of cars with 15000 annual mileage have claims;
50  run;
51
52  /* set up population */
53  data pop(keep=miles count mean);
54  do k=1 to 1000000;
55      miles=round(&mu+&sigma*rannor(6843614),1);
SYMBOLGEN: Macro variable MU resolves to 15000
SYMBOLGEN: Macro variable SIGMA resolves to 5000
56      if miles>2000 then do;
57      rate=&base*((miles<&1)*&c*(abs(&1-miles))**&p+(miles>&u)* &d*(abs(miles-&u))**&p+
57 ! 1);
SYMBOLGEN: Macro variable BASE resolves to .05/15000
SYMBOLGEN: Macro variable L resolves to 6000
SYMBOLGEN: Macro variable C resolves to exp(-11.5)
SYMBOLGEN: Macro variable L resolves to 6000
SYMBOLGEN: Macro variable P resolves to 1.8
SYMBOLGEN: Macro variable U resolves to 25000
SYMBOLGEN: Macro variable D resolves to exp(-12)
SYMBOLGEN: Macro variable U resolves to 25000
SYMBOLGEN: Macro variable P resolves to 1.8
58          mean=miles*rate;
59          count=ranpoi(5478954,mean);
60          output;
61      end;
62  end;
63  run;
```

NOTE: The data set WORK.POP has 995432 observations and 3 variables.
NOTE: DATA statement used:

```
             real time      5.31 seconds
             cpu time       4.84 seconds
64
65     /* aggregate the population data to each mileage level */
66     proc summary data=pop nway;
67     class miles;
68     var count;
69     output out=tot sum=;
70
```

NOTE: There were 995432 observations read from the data set WORK.POP.
NOTE: The data set WORK.TOT has 28563 observations and 4 variables.

NOTE: PROCEDURE SUMMARY used:

```
             real time      3.03 seconds
             cpu time       2.89 seconds
71     data one;
72     set tot;
73     expos=_freq_;          /* earned car years */
74     if miles<8000 then class=" <8000";
75     else class=">=8000";
76     run;
```

NOTE: There were 28563 observations read from the data set WORK.TOT.
NOTE: The data set WORK.ONE has 28563 observations and 6 variables.
NOTE: DATA statement used:

```
             real time      0.23 seconds
             cpu time       0.08 seconds
77
78     /* The formula in the procedure below is parameterized to solve for the log of the parameters
78     ! described in the model */
79
80     proc nlin data=one method=gauss;
81     parms lnl=8 lnradius=10 lnc=-10 lnd=-10 lnbase=-8 p=2;
82     c=exp(lnc); d=exp(lnd); base=exp(lnbase); l=exp(lnl); u=l+exp(lnradius);
83     model
83     ! count=expos*base*((miles<l)*c*(abs(l-miles))**p+(miles>u)*d*(abs(miles-u))**p+1);
84     output out=model 1 fit predicted=fit parms=lnl lnradius lnc lnd lnbase p;
85     run;
```

NOTE: DER.lnl not initialized or missing. It will be computed automatically.
NOTE: DER.lnradius not initialized or missing. It will be computed automatically.
NOTE: DER.lnc not initialized or missing. It will be computed automatically.
NOTE: DER.lnd not initialized or missing. It will be computed automatically.
NOTE: DER.lnbase not initialized or missing. It will be computed automatically.
NOTE: DER.p not initialized or missing. It will be computed automatically.
NOTE: PROC NLIN grid search time was 0:0:0.
NOTE: Convergence criterion met.
NOTE: The data set WORK.MODELIFIT has 28563 observations and 13 variables.
NOTE: PROCEDURE NUN used:

```
             real time      9.44 seconds
             cpu time       8.75 seconds
86
87     data test;
88     set model 1 fit;
89     if _n_=1;
90     c=exp(lnc); d=exp(lnd); base=exp(lnbase); l=exp(lnl); u=l+exp(lnradius);
91     run;
```

NOTE: There were 28563 observations read from the data set WORK.MODEL1 FIT.
NOTE: The data set WORK.TEST has 1 observations and 18 variables.
NOTE: DATA statement used:

```
          real time    0.18 seconds
          cpu time     0.08 seconds
92
93    proc print data=test noobs;
94    title 'Parameter Estimates for Rate Per Mile Curve';
95    var base l u c d p;
96    run;
```

NOTE: There were 1 observations read from the data set WORK.TEST.
NOTE: PROCEDURE PRINT used:

```
          real time    0.11 seconds
          cpu time     0.01 seconds
97
98    /*
99       Here is an alternative model for fitting rate per mile:
100
101       a*exp(c*(1-x))   if x<1
102    y=a                 if l<=x<=u
103       a*exp(d*(x-u))   if x>u
104
105    The code below shows how this formulation can be used */
106
107    proc nlin data=one method=gauss;
108    parms InI=8 Inradius=10 Inc=-10 Ind=-10 Inbase=-8;
109    c=exp(Inc); d=exp(Ind); base=exp(Inbase); l=exp(InI); u=l+exp(Inradius);
110    model count=expos*base*ex((miles<1)*c*abs(1-miles)+(miles>u)*d*abs(miles-u));
111    output out=model2fit predicted=fit parms=InI Inradius Inc Ind Inbase;
112    run;
```

NOTE: DER.lnl not initialized or missing. It will be computed automatically.
NOTE: DER.lnradius not initialized or missing. It will be computed automatically.
NOTE: DER.lnc not initialized or missing. It will be computed automatically.
NOTE: DER.lnd not initialized or missing. It will be computed automatically.
NOTE: DER.lnbase not initialized or missing. It will be computed automatically.
NOTE: PROC NUN grid search time was 0:0:0.
NOTE: Convergence criterion met.
NOTE: The data set WORK.MODEL2FIT has 28563 observations and 12 variables.
NOTE: PROCEDURE NUN used:

```
          real time    6.04 seconds
          cpu time     4.68 seconds
113
114    data test;
115    set model2fit;
116    if _n_=1;
117    c=exp(Inc); d=exp(Ind); base=exp(Inbase); l=exp(InI); u=l+exp(Inradius);
118    run;
```

NOTE: There were 28563 observations read from the data set WORK.MODEL2FIT.

NOTE: The data set WORK.TEST has 1 observations and 17 variables.

NOTE: DATA statement used:

|   |   |   |
|---|---|---|
|   | real time | 0.20 seconds |
|   | cpu time | 0.06 seconds |
| 119 |   |   |
| 120 | proc print data=test noobs; |   |
| 121 | title 'Parameter Estimates for alternative rate per mile Curve'; |   |
| 122 | var base l u c d; |   |
| 123 | run; |   |

NOTE: There were 1 observations read from the data set WORK.TEST.
NOTE: PROCEDURE PRINT used:

|   |   |   |
|---|---|---|
|   | real time | 0.11 seconds |
|   | cpu time | 0.01 seconds |
| 124 |   |   |
| 125 |   |   |
| 126 | /* the following code calculated annual mileage factors using the traditional method |   |
| 126 | ! */ |   |
| 127 |   |   |
| 128 | proc summary data=one nway; |   |
| 129 | class class; |   |
| 130 | var expos count; |   |
| 131 | output out=tot sum=; |   |
| 132 |   |   |

NOTE: There were 28563 observations read from the data set WORK.ONE.

NOTE: The data set WORK.TOT has 2 observations and 5 variables.

NOTE: PROCEDURE SUMMARY used:

|   |   |   |
|---|---|---|
|   | real time | 0.18 seconds |
|   | cpu time | 0.05 seconds |
| 133 | proc sort data=tot; by descending class; run; |   |

NOTE: There were 2 observations read from the data set WORK.TOT.
NOTE: The data set WORK.TOT has 2 observations and 5 variables.
NOTE: PROCEDURE SORT used:

|   |   |   |
|---|---|---|
|   | real time | 0.07 seconds |
|   | cpu time | 0.01 seconds |
| 134 |   |   |
| 135 | data two; |   |
| 136 | set tot; |   |
| 137 | retain basefact; |   |
| 138 | if _ n _=1 then basefact=count/expos; |   |

-continued

|   |   |
|---|---|
| 139 | annual_mileage_factor=(count/expos)/basefact; |
| 140 | keep class annual_mileage_factor basefact; |
| 141 | run; |

NOTE: There were 2 observations read from the data set WORK.TOT.

NOTE: The data set WORK.TWO has 2 observations and 3 variables.

NOTE: DATA statement used:

|   |   |   |
|---|---|---|
|   | real time | 0.20 seconds |
|   | cpu time | 0.03 seconds |
| 142 |   |   |
| 143 | proc print data=two noobs; |   |

-continued

|   |   |
|---|---|
| 144 | title 'Standard Mileage Rating Factor Calculation'; |
| 145 | var class annual_mileage_factor; |
| 146 | format annual_mileage_factor comma5.3; |
| 147 | run; |

NOTE: There were 2 observations read from the data set WORK.TWO.

NOTE: PROCEDURE PRINT used:

|   |   |   |
|---|---|---|
|   | real time | 0.13 seconds |
|   | cpu time | 0.00 seconds |

The following is a representation of the output from the SAS program in accordance with a first version of the implementation thereof.

The SAS System      14:10 Wednesday, Aug. 24, 2005   1

The NLIN Procedure
Dependent Variable count
Method: Gauss-Newton

| | Iterative Phase | | | | Sum of | | |
|---|---|---|---|---|---|---|---|
| Iter | lnl | lnradius | lnc | lnd | lnbase | p | Squares |
| 0 | 8.0000 | 10.0000 | −10.0000 | −10.0000 | −8.0000 | 2.0000 | 293838 |
| 1 | 8.2228 | 9.9634 | −16.1377 | −14.9575 | −3.3375 | 2.0511 | 155583 |
| 2 | 8.7326 | 9.8637 | −18.5177 | −15.3421 | −3.3131 | 2.1186 | 154070 |
| 3 | 8.5611 | 9.8264 | −17.2353 | −17.9143 | −3.2219 | 2.4594 | 104783 |
| 4 | 8.6720 | 9.8207 | −17.1978 | −16.0249 | −3.0415 | 2.3161 | 78747.2 |
| 5 | 8.7637 | 9.7933 | −17.4254 | −15.5668 | −2.9935 | 2.2626 | 78258.9 |
| 6 | 8.7168 | 9.8097 | −17.1713 | −15.5175 | −2.9922 | 2.2573 | 78240.0 |
| 7 | 8.7300 | 9.8042 | −17.2222 | −15.5043 | −2.9915 | 2.2558 | 78225.6 |
| 8 | 8.7158 | 9.8087 | −17.1621 | −15.5119 | −2.9912 | 2.2566 | 78225.1 |
| 9 | 8.7250 | 9.8055 | −17.2124 | −15.5203 | −2.9913 | 2.2575 | 78224.8 |
| 10 | 8.7227 | 9.8062 | −17.2038 | −15.5228 | −2.9913 | 2.2577 | 78224.8 |
| 11 | 8.7240 | 9.8057 | −17.2110 | −15.5244 | −2.9913 | 2.2579 | 78224.7 |
| 12 | 8.7238 | 9.8058 | −17.2108 | −15.5254 | −2.9913 | 2.2580 | 78224.7 |
| 13 | 8.7239 | 9.8057 | −17.2116 | −15.5257 | −2.9913 | 2.2581 | 78224.7 |
| 14 | 8.7239 | 9.8057 | −17.2117 | −15.5260 | −2.9913 | 2.2581 | 78224.7 |

NOTE: Convergence criterion met.

NOTE: Convergence criterion met.

| Estimation Summary | |
|---|---|
| Method | Gauss-Newton |
| Iterations | 14 |
| Subiterations | 11 |
| Average Subiterations | 0.785714 |
| R | 5.572E−6 |
| PPC(Inc) | 0.000014 |

-continued

| Estimation Summary | |
|---|---|
| Method | Gauss-Newton |
| RPC(lnd) | 0.000019 |
| Object | 7.84E−11 |
| Objective | 78224.75 |
| Observations Read | 28563 |
| Observations Used | 28563 |
| Observations Missing | 0 |

NOTE: An intercept was not specified for this model.

| Source | DF | Sum of Squares | Mean Square | Approx F Value | Pr > F |
|---|---|---|---|---|---|
| Regression | 6 | 239890 | 39981.7 | 14595.9 | <.0001 |
| Residual | 28557 | 78224.7 | 2.7392 | | |
| Uncorrected Total | 28563 | 318115 | | | |
| Corrected Total | 28562 | 151571 | | | |

| Parameter | Estimate | Approx Std Error | Approximate 95% Confidence Limits | |
|---|---|---|---|---|
| lnl | 8.7239 | 0.0342 | 8.6568 | 8.7909 |
| lnradius | 9.8057 | 0.0128 | 9.7807 | 9.8308 |
| lnc | −17.2117 | 0.3569 | −17.9112 | −16.5122 |
| lnd | −15.5260 | 0.3394 | −16.1912 | −14.8608 |
| lnbase | −2.9913 | 0.00437 | −2.9999 | −2.9827 |
| p | 2.2581 | 0.0360 | 2.1876 | 2.3286 |

| Approximate Correlation Matrix | | | | | | |
|---|---|---|---|---|---|---|
| | lnl | lnradius | lnc | lnd | lnbase | p |
| lnl | 1.0000000 | −0.9561780 | −0.5838276 | −0.1675303 | −0.0571592 | 0.1682646 |
| lnradius | −0.9561780 | 1.0000000 | 0.7762480 | 0.4327487 | 0.0649411 | −0.4304163 |
| lnc | −0.5838276 | 0.7762480 | 1.0000000 | 0.8838384 | 0.0308411 | −0.8845068 |
| lnd | −0.1675303 | 0.4327487 | 0.8838384 | 1.0000000 | 0.0173518 | −0.9993114 |
| lnbase | −0.0571592 | 0.0649411 | 0.0308411 | 0.0173518 | 1.0000000 | −0.0291993 |
| p | 0.1682646 | −0.4304163 | −0.8845068 | −0.9993114 | −0.0291993 | 1.0000000 |

-continued

| Parameter Estimates for Rate Per Mile Curve | | | | 14:10 Wednesday, Aug. 24, 2005   2 | |
|---|---|---|---|---|---|
| base | l | u | c | d | P |
| 0.050222 | 6147.94 | 24285.61 | 3.3499E−8 | .000000181 | 2.25808 |

The following is a representation of the output from the SAS program in accordance with a second version of the implementation thereof.

The NLIN Procedure
Dependent Variable count
Method: Gauss-Newton

| | Iterative Phase | | | | Sum of |
|---|---|---|---|---|---|
| Iter | lnl | lnradius | lnc | lnd | lnbase | Squares |
| 0 | 8.0000 | 10.0000 | −10.0000 | −10.0000 | −8.0000 | 316136 |
| 1 | 8.1874 | 10.0122 | −9.8802 | −8.2455 | −7.9909 | 316080 |
| 2 | 8.7527 | 9.8733 | −9.4003 | −7.8993 | −7.9457 | 315926 |
| 3 | 8.3693 | 9.7703 | −7.2920 | −7.9232 | −7.7301 | 314802 |
| 4 | 8.7625 | 9.6790 | −8.0603 | −7.6570 | −6.8788 | 308577 |
| 5 | 8.1739 | 9.7869 | −6.4728 | −7.9256 | −5.0922 | 272113 |
| 6 | 8.5500 | 9.7520 | −7.7807 | −7.5599 | −3.8134 | 159989 |
| 7 | 8.7946 | 9.6224 | −7.6153 | −7.7768 | −2.9929 | 94665.4 |
| 8 | 8.6298 | 9.6707 | −7.5133 | −7.8021 | −3.0009 | 93050.4 |
| 9 | 8.6210 | 9.6677 | −7.5803 | −7.7978 | −3.0066 | 92801.1 |
| 10 | 8.6238 | 9.6644 | −7.5956 | −7.8011 | −3.0082 | 92796.5 |
| 11 | 8.6210 | 9.6653 | −7.5886 | −7.8010 | −3.0088 | 92796.3 |
| 12 | 8.6223 | 9.6648 | −7.5916 | −7.8010 | −3.0088 | 92796.3 |
| 13 | 8.6223 | 9.6648 | −7.5916 | −7.8010 | −3.0088 | 92796.3 |

NOTE: Convergence criterion met.

NOTE: Convergence criterion met.

| Estimation Summary | |
|---|---|
| Method | Gauss-Newton |
| Iterations | 13 |
| Subiterations | 15 |
| Average Subiterations | 1.153846 |
| R | 4.07E-6 |
| PPC(lnbase) | 3.71E-7 |
| RPC(lnc) | 6.629E-6 |
| Object | 1.816E-9 |
| Objective | 92796.32 |
| Observations Read | 28563 |
| Observations Used | 28563 |
| Observations Missing | 0 |

NOTE: An intercept was not specified for this model.

| Source | DF | Sum of Squares | Mean Square | F Value | Approx Pr > F |
|---|---|---|---|---|---|
| Regression | 5 | 225319 | 45063.7 | 13868.3 | <.0001 |
| Residual | 28558 | 92796.3 | 3.2494 | | |
| Uncorrected Total | 28563 | 318115 | | | |
| Corrected Total | 28562 | 151571 | | | |

| Parameter | Approx Estimate | Std Error | Approximate | 95% Confidence Limits |
|---|---|---|---|---|
| lnl | 8.6223 | 0.0285 | 8.5663 | 8.6783 |
| lnradius | 9.6648 | 0.0103 | 9.6446 | 9.6850 |
| lnc | −7.5916 | 0.0714 | −7.7316 | −7.4516 |
| lnd | −7.8010 | 0.00309 | −7.8071 | −7.7950 |
| lnbase | −3.0088 | 0.00493 | −3.0184 | −2.9991 |

| Approximate Correlation Matrix | | | | | |
|---|---|---|---|---|---|
| | lnl | lnradius | lnc | lnd | lnbase |
| lnl | 1.0000000 | −0.9805862 | −0.8887617 | 0.0000000 | −0.0615517 |
| lnradius | −0.9805862 | 1.0000000 | 0.8674553 | 0.1572147 | 0.1341490 |
| lnc | −0.8887617 | 0.8674553 | 1.0000000 | −0.0000000 | 0.0000000 |
| lnd | 0.0000000 | 0.1572147 | −0.0000000 | 1.0000000 | −0.0000000 |
| lnbase | −0.0615517 | 0.1341490 | 0.0000000 | −0.0000000 | 1.0000000 |

| Parameter Estimates for alternative rate per mile Curve 4 | | | | |
|---|---|---|---|---|
| 14:10 Wednesday, Aug. 24, 2005 | | | | |
| base | l | u | c | d |
| 0.049351 | 5554.14 | 21307.11 | .000504674 | .000409311 |

-continued

Standard Mileage Rating Factor Calculation

| class | annual_mileage_factor |
|---|---|
| >=8000 | 1.000 |
| <8000 | 0.729 |

The following equations are examples of other usage rating methods that offer alternatives to the traditional linear per-mile approach. It should be noted, however, that a wide variety of nonlinear calculation methods can be used to implement the present invention.

In one embodiment of the invention, a step function is used to create a nonlinear, incremental method of calculating insurance. This method is a tiered per-mile approach, whereby the rate per mile is adjusted as the vehicle is driven more. As the mileage increases within established mileage ranges, the cost reflects the risk associated with loss costs within that particular range.

Table 7 below demonstrates the creation and separation of multiple mileage ranges and the calculated costs involved when a user's mileage falls within one of the ranges.

TABLE 7

| Mileage Range | Rate/Mile | Cost ($) |
|---|---|---|
| $0 \leq m \leq x$ | A | Am |
| $x < m \leq y$ | B | $Ax' + B(m - x)$ |
| $y < m \leq z$ | C | $Ax' + By' + C(m - y)$ |
| $z < m$ | D | $Ax' + By' + Cz' + D(m - z)$ |

In this example, m is the number of actual miles driven over a given period of time; x is the upper mileage limit of the first mileage range; y is the upper mileage limit of the second range; and z is the upper mileage limit of the third range. Furthermore, $x'=x$; $y'=(y-x)$; and $z'=(z-y)$. A is the rate charged per mile driven within the first mileage range. B is the rate charged per mile driven within the second mileage range. C is the rate charged per mile driven within the third mileage range. D is the rate charged per mile driven within the fourth mileage range. It should be noted that, in this example, A, B, C, and D represent a cost rate per mile. However, in other applications, A, B, C, and D can represent a rate factor that is multiplied by a base rate, along with other rate factors in a multivariate calculation.

Figure 3:
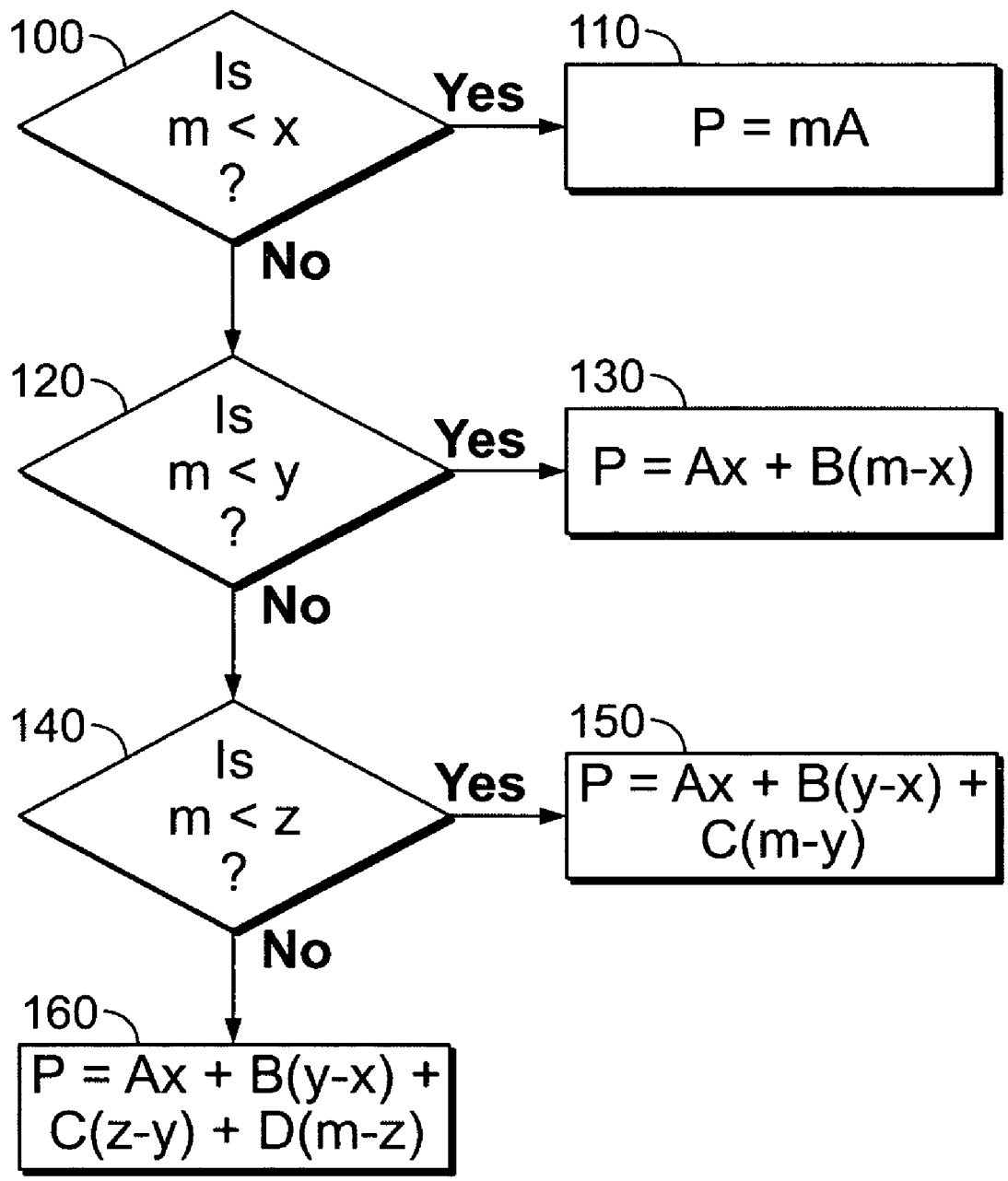
FIG. 3 is a flow chart showing a process for calculating an insurance cost according to one embodiment of the present invention.

An algorithm for computing the insurance cost based upon the above model is depicted in FIG. 3. This process can be implemented by virtually any type of automatic system, such as a computer, and a computer program product can be used for the appropriate computations. At step 100 in FIG. 3, a system determines whether the variable m is less than x. If so, then the price or cost (P) is calculated as mA at step 110. If m is not less than x, then at step 120 the system determines whether m is less than y. If so, then at step 130, the cost P is calculated to be $Ax+B(m-x)$. If m is not less than y, then at step 140 it is determined whether m is less than z. If so, then at step 150, P is calculated to be $Ax+B(y-x)+C(m-y)$. If m is not less than z, then at step 160, the cost P is calculated to be $Ax+B(y-x)+C(z-y)+D(m-z)$.

Tables 8 and 9 below show the implementation of the formulae discussed above, with values of $0.10, $0.05 and $0.08 being assigned to A, B and C, respectively. The x, y and z variables have been identified as 1,000; 7,000 and 15,000 miles, respectively. In Table 9, costs are determined for an individual who drives 1,000; 6,000 and 14,000 miles, respectively.

TABLE 8

| Mileage Range | Rate/Mile | Cost ($) |
|---|---|---|
| $0 \leq m \leq 1,000$ | A = $0.10 | Am |
| $1,000 < m \leq 7,000$ | B = $0.05 | $Ax' + B(m - x)$ |
| $7,000 < m \leq 15,000$ | C = $0.08 | $Ax' + By' + C(m - y)$ |

TABLE 9

| Miles Driven (m) | Calculation | Cost($) |
|---|---|---|
| 1,000 | (.10) 1,000 | $100 |
| 6,000 | (.10) 1,000 + (.05)(6,000-1,000) | $350 |
| 14,000 | (.10) 1,000 + (.05)(7,000-1,000) + (.08)(14,000-7,000) | $960 |

Another approach for implementing the present invention involves factoring risk by applying a single rate per mile driven, but having the rate vary as the miles driven fall within established ranges. In this situation, the rate would reflect the aggregate risk associated with the mileage driven from zero through to the final range. Therefore, the risk factor for mileage falling within the second rating range would include the risks associated with both the first and second ranges. An example is depicted in Table 10 below.

TABLE 10

| Mileage Range | Rate/mile | Cost ($) |
|---|---|---|
| $0 \leq m \leq x$ | A | Am |
| $x < m \leq y$ | B | Bm (same as $Bx + By'$) |
| $y < m \leq z$ | C | Cm (same as $Cx + Cy' + Cz'$) |
| $z < m$ | D | Dm (same as $Dx + Dy' + Dz' + Dq'$) |

In this situation, m is the number of actual miles driven over a given period of time; x is the upper mileage limit of the first mileage range; y is the upper mileage limit of the second range; and z is the upper mileage limit of the third range. Furthermore, $x'=x$; $y'=(y-x)$; $z'=(z-y)$; and $q'=(m-z)$. A is the rate charged per mile driven within the first mileage range. B is the rate charged per mile driven within the second mileage range. C is the rate charged per mile driven within the third mileage range. D is the rate charged per mile driven within the fourth mileage range. It should be noted that A, B, C, and D can represent a rate factor that is multiplied by a base rate, along with other rate factors in a multivariate calculation, if desired.

Both Tables 7 and 10 can be restated in a format similar to that discussed previously for the RMF. In such a format: RMF=A if distance$\leq$x RMF=B if x$\leq$distance<y RMF=C if y$\leq$distance<z RMF=D if distance>z Tables 11 and 12 below show the implementation of this formulation, with values of $0.10, $0.05 and $0.08 being assigned to A, B and C, respectively. The x, y and z variables have been identified as 1,000; 7,000 and 15,000 miles, respectively. In Table 12, costs are determined for an individual who drives 1,000; 6,000 and 14,000 miles, respectively.

TABLE 11

| Mileage Range | Rate/Mile | Cost ($) |
| --- | --- | --- |
| $0 \leq m \leq 1{,}000$ | A = $0.10 | Am |
| $1{,}000 < m \leq 7{,}000$ | B = $0.05 | Bm |
| $7{,}000 < m \leq 15{,}000$ | C = $0.08 | Cm |
| $m > 15{,}000$ | D = $0.10 | Dm |

TABLE 12

| Miles Driven (m) | Calculation | Cost ($) |
| --- | --- | --- |
| 1,000 | (.10) 1,000 | $100 |
| 6,000 | (.05) 6,000 | $300 |
| 14,000 | (.08) 14,000 | $1,120 |

Generally, the initial rating period will begin when the insurance policy purchased by a customer becomes effective, or at the renewal effective date for that policy. A typical period for auto insurance is either twelve months or six months. For usage-based policies, a month may be typical, although the period can be varied to virtually any duration.

A wide variety of formulae can be used for the implementation of the present invention. For example, a pricing system according to the principles of the present invention can include virtually any number of pricing ranges, and the pricing ranges can be as small as a single or fractional unit of usage such as mile, kilometer, or other unit of distance; or day, hour, or other unit of time. Based upon the use of actuarial information, a more precise pricing curve can be calculated for each unit of usage. As another example, actual usage information can be used with one or more other cost-related variables to assign an actuarial class or tier that is then used to calculate a final cost.

The collection of usage information for determining insurance cost can occur by various methods. For example, mileage information can be taken when a claim is filed, when reported by the customer, when reported by a service center following a visit by the customer, when taken by the insurer or a third party (for example, at the end of a premium period or at renewal), or by using telematics, which involves the collection of data by an onboard data recorder, where the data can be communicated manually through a networked computer or automatically using wireless communication. Such onboard data recorders can also be used to measure time of usage. Other methods can also be used to collect and transmit this information as well. In one embodiment of the invention, usage discounts are made available only to customers who share usage information with the insurer.

To apply a variable usage-based rating factor properly, the per-unit rate varies either linearly within usage ranges or nonlinearly over all possible usage values. A nonlinear relationship would be based in part on cost factors derived by correlating loss cost data on a per-unit basis to average loss costs. Other variables that might be used to determine a linear or nonlinear relationship include price elasticity data and competitor data (such as rate filings).

The final cost of usage-based insurance can be calculated using multiple variables to determine a retrospective or prospective adjustment based on actual usage. A wide range of variables can be used for this purpose, including but not limited to: territory, vehicle type, and driver characteristics such as age, gender, marital status, and driving record.

The following is a generic example multivariate calculation of an insurance cost using other variables. In this example, $P_{adjusted} = P_{base} \times F_{mileage} \times F_{state} \times F_{class}$, where $P_{final}$ is the adjusted premium; $P_{base}$ is the unadjusted premium; $F_{mileage}$ is a rating factor based upon insured's actual mileage; $F_{state}$ is a rating factor based upon the insured's home state; and $F_{class}$ is a rating factor based upon the insured's actuarial class or tier. As used herein, the terms "class" and "tier" refer to a variety of types of categorization an insurer might use to simplify the calculation of rates and prices using one or more variables.

Figure 4:
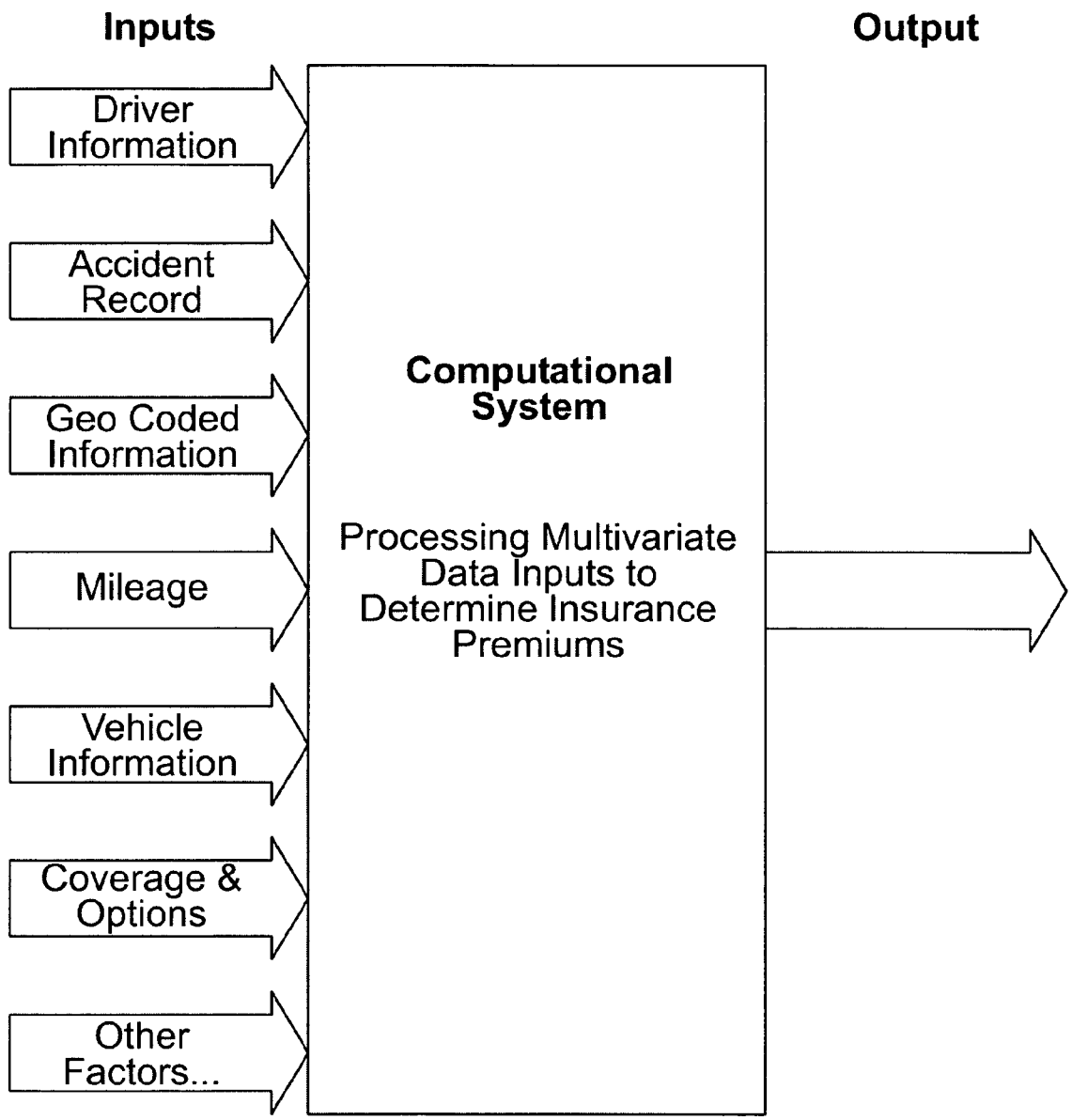
FIG. 4 is a representation of a generic computation system with inputs and outputs for calculating insurance costs according to one embodiment of the present invention.

As illustrated in FIG. 4, the cost calculation can be performed by a system that uses multiple variables as input and produces a premium as output. As shown in FIG. 4, these factors may include driver information, the driver's accident record, credit score, mileage driven, vehicle information, insurance coverage and options, and other factors.

Figure 5:
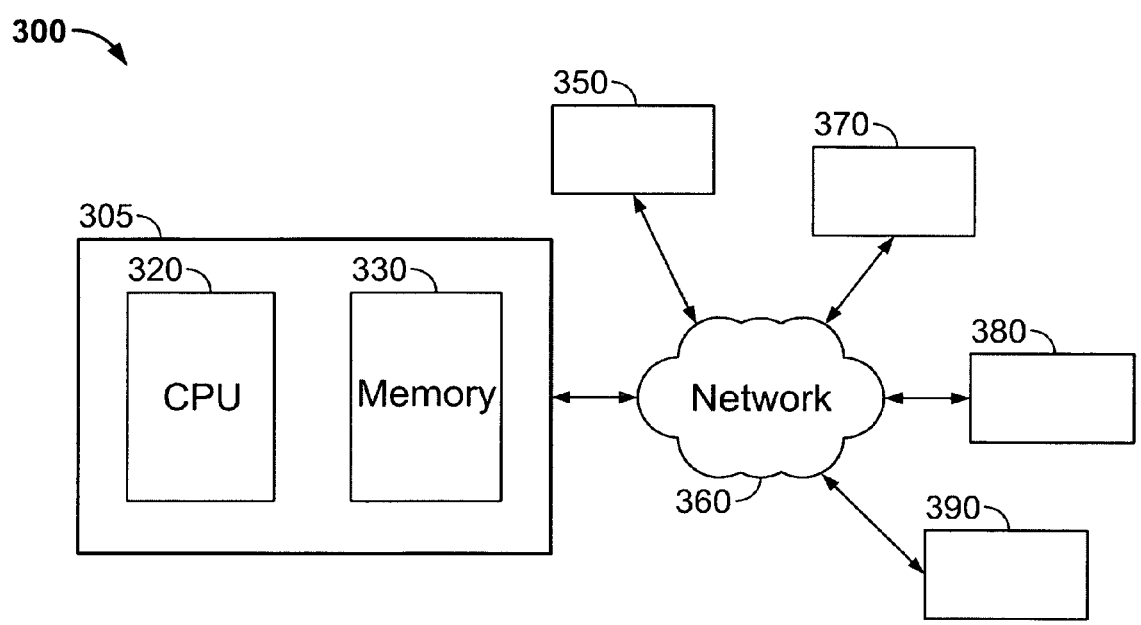
FIG. 5 is a diagram showing a generic system which can implement one embodiment of the present invention.

FIG. 5 shows a system 300 that may be used to calculate the cost. The system 300 may include a computational platform 305 such as a computer, an access server 350, and various user terminals 370-390. The computational platform 305 can include a central processing unit (CPU) 320 and a memory 330.

The present invention is described in the general context of method steps, which may be implemented in one embodiment by a program product including computer-executable instructions, such as program code, executed by computers in networked environments. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps.

While preferred embodiments of the invention have been shown and described, it will be clear to those skilled in the art, that potential modifications can be made to the embodiments described above. For example, the unit distance that is used as a basis for rate determination can be a mile, a kilometer, or virtually any other incremental measurement of distance. Additionally, the time period for which the insurance rates are calculated can vary, and both the per unit costs and particular distance ranges can also be modified accordingly. Furthermore, it should be noted that the present invention is not limited to any specific type of automobile or vehicle, but instead can be applied to virtually any type of vehicle, including motorcycles, trucks, factory machines, farm machines, motor homes, tractors, vans, buses, boats and other watercraft and aircraft. It should also be noted that a pricing system according to the principles of the present invention can include pricing ranges relating to units of time, such as a day or hour, and can also use other non-distance units for pricing ranges. It will therefore be well understood by those in the art that modifications can be made to the above embodiments without departing from the invention in its broader aspects.

We claim:

1. A method of determining a distance-based premium for vehicle insurance for a customer, comprising:
   inputting into a user terminal an actual or estimated customer distance driven for the customer over a designated time interval;
   transmitting from the user terminal to a computational platform the actual or estimated customer distance driven for the customer over the designated time interval;
   determining in the computational platform, a rate per distance unit factor for the customer based upon a plurality of criteria, wherein the rate per distance unit factor over an initial driving range is greater than the rate per distance unit factor over a subsequent driving range;
   executing in the computational platform a per distance unit based premium calculation based upon the customer's determined rate per distance unit factor; and
   determining, in the computational platform, a distance-based premium for the customer using the per distance unit based premium calculation.

2. The method of claim 1, wherein the rate per distance unit factor is based upon a rate per distance unit equation for a rate per distance unit curve.

3. The method of claim 2, wherein the rate per distance unit equation is determined by:
   inputting a plurality of distance data and loss data;
   correlating the distance data with the loss data, the correlation exhibiting a curve with non-linear distance-based relationship;
   applying a curve fitting technique to the correlated distance data and loss data to find an equation that closely matches the exhibited curve.

4. The method of claim 2, wherein the rate per distance unit curve includes a curve portion where the rate per distance unit driven over the subsequent driving range is less than the rate per distance unit driven over a further subsequent driving range.

5. The method of claim 1, wherein the distance unit comprises a mile.

6. The method of claim 1, wherein the distance unit comprises a kilometer.

7. The method of claim 1, wherein the determined distance-based premium for the customer is based in part upon criteria selected from the group consisting of the age of the customer, the geographical location of the customer's residence, characteristics of the vehicle driven by the customer, the customer's driving record and combinations thereof.

8. The method of claim 1, further comprising adding an additional factor to the determined distance-based premium to determine a modified premium, the additional factor being based at least in part upon criteria selected from the group consisting of the age of the customer, the geographical location of the customer's residence, characteristics of the vehicle driven by the customer, the customer's driving record and combinations thereof.

9. An electronic device, comprising:
   a processor; and
   a memory unit operatively connected to the processor and including a computer program product for determining a distance-based premium for vehicle insurance for a customer, comprising:
      computer code for providing an actual or estimated customer distance driven for the customer over a designated time interval;
      computer code for determining a rate per distance unit factor for the customer based upon a plurality of criteria, where the rate per distance unit factor over an initial driving range is greater than the rate per distance unit factor n over a subsequent driving range,
      computer code for inputting the customer's determined rate per distance unit factor into a per distance unit based premium calculation, and
      computer code for using the per distance unit based premium calculation to determine a distance-based premium for the customer.

10. The electronic device of claim 9, wherein the rate per distance unit factor is based upon a rate per distance unit equation for a rate per distance unit curve.

11. The electronic device of claim 10, wherein the rate per distance unit equation is determined by:
    inputting a plurality of distance data and loss data;
    correlating the distance data with the loss data, the correlation exhibiting a curve with non-linear distance-based relationship;
    applying a curve fitting technique to the correlated distance data and loss data to find an equation that closely matches the exhibited curve.

12. The electronic device of claim 11, wherein the rate per distance unit curve includes a curve portion where the rate per distance unit driven over the subsequent driving range is less than the rate per distance unit driven over a further subsequent driving range.

13. A method for determining a rate per distance unit equation for use in calculating a distance-based driving insurance premium, comprising:
    providing a system comprising a user interface, a processor and a memory unit;
    inputting into the system via the user interface a plurality of distance data and loss data;
    engaging the processor to correlate the distance data with the loss data, the correlation exhibiting a rate per distance unit curve with non-linear distance-based relationship; and
    applying a curve fitting technique to the correlated distance data and loss data to find an equation that closely matches the exhibited curve.

14. The method of claim 13, wherein the rate per distance unit curve includes a curve portion where a rate per distance unit factor over a subsequent driving range is less than the rate per distance unit factor over a further subsequent driving range.

15. The method of claim 13, wherein the application of the curve fitting technique includes identifying a plurality of parameters which, when used in a rate per distance unit equation, minimizes differences between actual claim counts and fitted claim counts using the rate per distance unit equation.

16. The method of claim 15, wherein the differences between the actual claim counts and the fitted claim counts are measured by using a squared error between the actual claim counts and fitted claim counts.

17. An electronic device, comprising:
    a processor; and
    a memory unit operatively connected to the processor and including a computer program product for determining a distance-based premium for vehicle insurance for a customer, comprising:
    computer code for inputting a plurality of distance data and loss data;
    computer code for correlating the distance data with the loss data, the correlation exhibiting a rate per distance unit curve with non-linear distance-based relationship; and computer code for applying a curve fitting technique to the correlated distance data and loss data to find an equation that closely matches the exhibited rate per distance unit curve.

18. The electronic device of claim 17, wherein the application of the curve fitting technique includes identifying a plurality of parameters which, when used in a rate per distance unit equation, minimizes differences between actual claim counts and fitted claim counts using the equation.

* * * * *

UNITED STATES PATENT AND TRADEMARK OFFICE
CERTIFICATE OF CORRECTION

| | |
|---|---|
| PATENT NO. | : 7,937,278 B1 |
| APPLICATION NO. | : 11/327559 |
| DATED | : May 3, 2011 |
| INVENTOR(S) | : Frederick F. Cripe and Stephen Fiete |

It is certified that error appears in the above-identified patent and that said Letters Patent is hereby corrected as shown below:

Column 26, Claim 9, Line 3, "n" should be deleted.

Signed and Sealed this
Thirteenth Day of September, 2011

David J. Kappos
*Director of the United States Patent and Trademark Office*